United States Patent [19]

Kaminski

[11] Patent Number: 5,065,064
[45] Date of Patent: Nov. 12, 1991

[54] ROTOR SLOT INSULATION IN ROTORS WITH SUBSLOTS

[75] Inventor: Christopher A. Kaminski, Schenectady, N.Y.

[73] Assignee: General Electric Company, Schenectady, N.Y.

[21] Appl. No.: 531,066

[22] Filed: May 31, 1990

[51] Int. Cl.⁵ .............................................. H02K 3/34
[52] U.S. Cl. ..................................... 310/215; 310/45; 310/61
[58] Field of Search ................. 310/215, 214, 61, 261, 310/45, 194, 198; 336/196

[56] References Cited

U.S. PATENT DOCUMENTS

| | | | |
|---|---|---|---|
| 1,308,064 | 7/1919 | Griffith . | |
| 1,985,040 | 12/1934 | Laffoon | 310/61 |
| 3,659,129 | 4/1972 | Pettersen | 310/216 |
| 4,152,610 | 5/1979 | Wallenstein | 310/59 |
| 4,298,812 | 11/1981 | Damiron | 310/61 |
| 4,321,498 | 3/1982 | Vogt | 310/215 |
| 4,473,765 | 9/1984 | Butman, Jr. et al. | 310/215 |
| 4,667,125 | 5/1987 | Kaminski et al. | 310/214 |
| 4,859,891 | 8/1989 | Jenkins et al. | 310/215 |

Primary Examiner—R. Skudy
Attorney, Agent, or Firm—Nixon & Vanderhye

[57] ABSTRACT

Rotor slot insulation for dynamoelectric machines having rotors with subslots including two slot armors, each extending in an offset manner to the transition between the rotor slot and subslot and into the subslot a distance sufficient to eliminate the need for a subslot cover and for providing a creepage path of sufficient length as to prevent creepage between slot windings and rotor iron.

13 Claims, 1 Drawing Sheet

ROTOR SLOT INSULATION IN ROTORS WITH SUBSLOTS

FIELD OF THE INVENTION

The invention relates to improvements in slot insulation for any conventionally cooled rotor for dynamoelectric machines wherein the rotors have subslots.

BACKGROUND AND SUMMARY OF THE INVENTION

Rotor slot insulation systems as found in conventional large dynamoelectric machines employing forged rotors of magnetic material which include machined slots are conventionally cooled by the flow of coolant gas in subslots through openings in conductors and insulating layers. The manner in which the rotor slots are shaped and insulated as well as the efficiency of the coolant flow channels for dissipating heat from the windings present formidable space utilization design problems particularly where high maximum permissible current limits are contemplated. For example, the copper bars in a rotor slot are insulated from the magnetic material of the rotor through the use of slot armors or sheets of insulation. Since the rotors of large dynamoelectric machines include subslots for carrying a coolant gas to the radial flow channels in the copper windings, the windings in addition to being insulated from the rotor material must be supported above the subslots. It is conventional to perform such functions by laying a relatively thick piece of insulation known as a subslot cover at the junction of the rotor slot and subslot where in addition to performing the support and insulation functions, the subslot cover includes openings in the insulation to allow the coolant gas to pass from the subslot to the copper. Such openings, of course, reduce the electrical path length from the conductors to the rotor and, therefore, provide an electrical creepage path between the windings and the bottom of the rotor slot. Added to the noted insulation problem is the fact that the gas coolant itself may be contaminated with electrically conductive particles such as carbon dust.

In light of such problems subslot covers of the prior art have taken quite complicated shapes, such as that which is illustrated in FIG. 1, for example. FIG. 1 illustrates a subslot 10 and a full length subslot cover 1 having the illustrated cross section and which includes radially directed ventilation passages 6 along its length that have been machined on a two to four inch pitch. The short legs of the L-shaped slot armors, 2 and 3, are inserted into narrow slits on each side of the subslot cover and are bonded to it prior to assembly into the rotor slot through the use of an adhesive.

Such a subslot cover is illustrated in FIG. 1 of commonly assigned U.S. Pat. No. 4,859,891 issued to Jenkins et al on Aug. 22, 1989. This commonly assigned patent additionally illustrates several embodiments of another design approach wherein the subslot would be machined to the same width as the rotor slot. Such an approach permits the insertion of a U-shaped slot armor, for example, which extends throughout the slot and subslot wherein the winding conductors are supported above the subslot through the use of a second U-shaped insert that snugly fits inside the U-shaped armor in the bottom of the slot. Although such an approach eliminates the need for a subslot cover, it could be improved from the standpoint of space utilization.

Another approach would include two straight sheets of armor with a thick creepage block at both the top and bottom ends of the slot. Although the subslot cover of such an embodiment would be less complicated than that illustrated in FIG. 1, it provides poorer radial space utilization which results in the use of larger rotors as well as requiring additional machining so as to provide ventilation openings in the creepage blocks.

A still further approach would involve the molding of a large number of short plastic pieces which when snapped together form a subslot cover having the cross section shown in FIG. 1. The axial length of such pieces would coincide with the ventilation opening pitch resulting in each piece having one ventilation opening. The pieces would be assembled together with a single U-shaped armor by pressing one of the pieces through an opening cut in the bottom of the U-shaped armor with a mating piece snapped onto it from the other side of the armor. Such assembly would be repeated for each of the openings over the length of the armor. Clearly the latter approach is complicated and time consuming.

I have discovered that in dynamoelectric machines utilizing rotors with subslots, a rotor slot can be insulated using two slot armors each with an extra fold which thereby extends the armor part way into the subslot thus making use of both sides of the armor surface and extending the creepage path almost entirely in the radial axial plane. Such an extended creepage path provides surfaces which tend to be self cleaning since they do not collect carbon dust and other contaminants from the gas coolant. Additionally, my new concept for rotor slot insulation would eliminate the need for a subslot cover.

Accordingly, the primary objective of my invention is that of providing a simpler, more versatile rotor slot insulation system with a minimum number of parts but which provides more uniform and efficient cooling of the rotor.

These and further objects and advantages of the present invention will become more apparent upon reference to the following specification, appended claims and drawings.

DETAILED DESCRIPTION OF THE DRAWINGS

Figure 1:
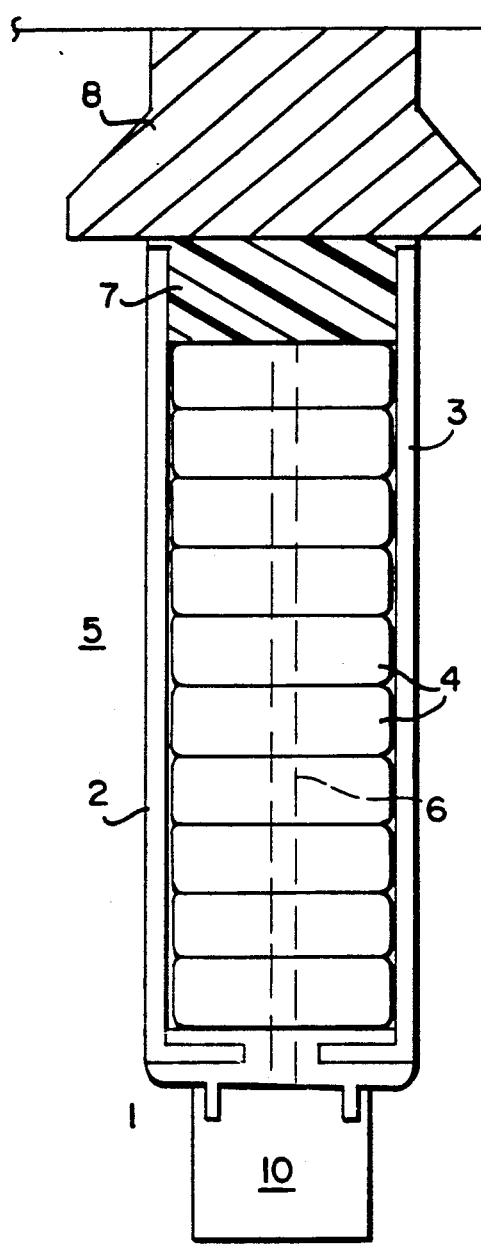
FIG. 1 is a diagram of a dynamoelectric rotor slot and subslot illustrating L-shaped slot armors and a subslot cover according to the prior art.

As illustrated in FIG. 1, it is known to use L-shaped slot armors 2 and 3 in combination with a subslot cover 1 for the purpose of insulating the copper windings or conductors 4 in a rotor slot from the rotor iron 5. The subslot cover as well as the slot armors are fabricated to extend the full length of the slots and subslots 10, and the subslot cover may be fabricated to include the relatively complex cross section illustrated in FIG. 1.

Such subslot covers are included in rotor designs having subslots which carry gas coolant to radially directed passages 6 in the copper. Accordingly, the subslot covers require openings, normally spaced on a two to four inch pitch, to allow the high velocity gas coolant such as air or hydrogen to flow from the subslot 10 and through the passages 6 in the copper windings.

However, the openings in the subslot cover insulation provide an electrical creepage or discharge path which may in operation become contaminated with electrically conductive particles such as carbon dust contained in the gas coolant. Accordingly, subslot covers of the prior art such as that illustrated in FIG. 1 can take quite complicated shapes as well as being relatively thick. As illustrated in FIG. 1, the short legs of the L-shaped slot armor elements are inserted into the narrow slits on each side of the subslot cover and are bonded to it with an adhesive prior to assembly into the rotor slot. Thereafter, copper windings 4, creepage blocks 7 and dovetail wedges 8 are included in the slots. Creepage blocks 7 insulate the copper windings from the dovetail wedges which resist the radially outward forces exerted on the windings when the rotor is in operation.

Figure 2:
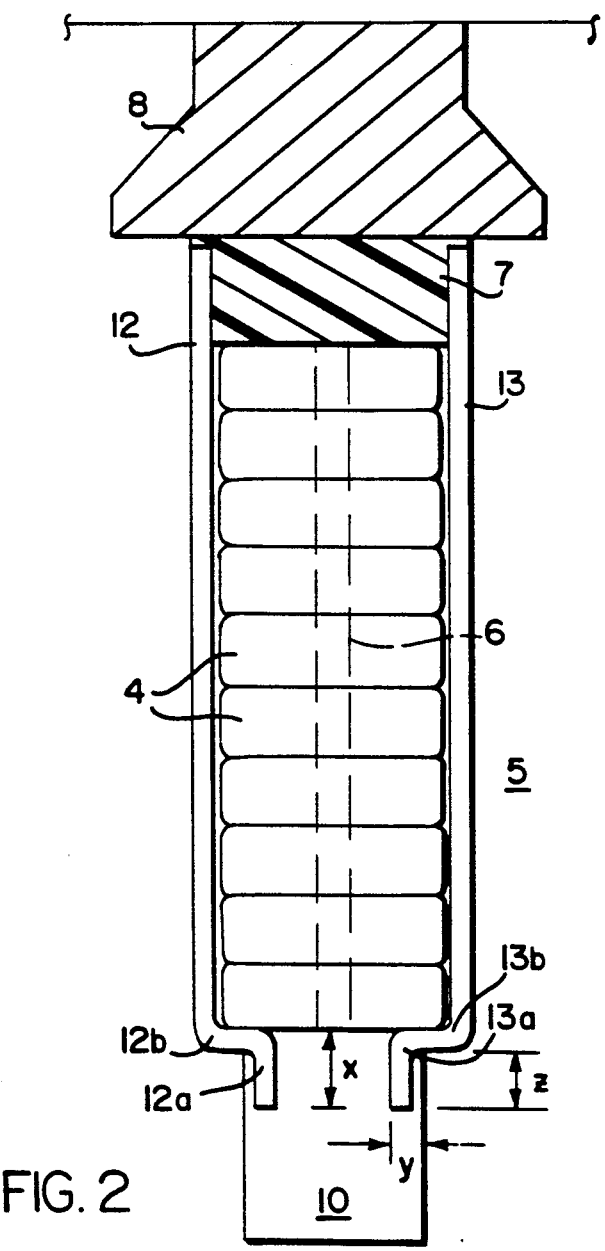
FIG. 2 is a cross section of a rotor slot illustrating my specially molded slot armors that extend radially into the subslot and eliminate the need for a subslot cover.

As illustrated in FIG. 2, I have designed two slot armors 12 and 13 of conventional insulating material uniform thickness to include extra folds or non-radial armor portions 12b and 13b respectively so that extensions or armor portions 12a and 13a extend the armor part way into the subslot 10 and spaced from the sides of the subslots. Other elements such as conductors 4, rotor iron 5, radial passages 6, creepage block 7 and dovetail wedges 8 are substantially the same as shown in FIG. 1. The additional electrical creepage path length provided by the illustrated arrangement eliminates the need for a subslot cover between the bottom conductor 4 and the subslot 10. Elimination of the subslot cover also allows for more uniform cooling of the rotor as well as providing a less expensive assembly.

As illustrated in FIG. 2, the extra folds in the armor halves extend radially into the subslot in such a manner that the effective creepage path length is the sum of dimensions x, y and z. The minimum length of each extension 12a and 13a, therefore, may be about half the required creepage length since both the inside and outside surfaces of the added length contribute to the electrical creepage distance between the bottom conductor and the rotor iron.

Although the improved rotor slot insulation is illustrated using a rectangular slot, the concept, of course, would apply equally to tapered slots. Furthermore, the concept of the disclosed exemplary embodiment would be useful in any rotor slot which has a subslot. That is to say, it would apply to all radial flow rotor designs and dual cooled rotor designs independent of the number of poles or the number of coils per pole and would additionally apply to any conventionally cooled rotor having subslots.

In addition to the aforementioned advantages, it is to be noted that exposing the conductors directly to the subslot will enhance the ampere-turn capability of the field windings. The latter advantage occurs in my insulation arrangement since it eliminates the subslot cover and its complicated geometry, thus exposing the bottom surface of the bottom conductor directly to the gas coolant flow in the subslot. Such exposure thus increases the total conductor area exposed to the gas coolant, thereby lowering the temperature rise over that experienced in the prior art.

An additional advantage of the disclosed embodiment is that of making the axial temperature profile of such rotors more uniform. That is to say, prior art rotors are normally cooler at the axial center and hotter toward either end of the rotor due to the manifold effect of the subslot which creates a larger turning loss into the first or end radial ducts where the subslot velocity is large and a lower turning loss into the radial ducts nearer the axial center of the rotor where subslot velocity is lower as a consequence of gas coolant being bled off into each radial duct along the way. By eliminating the insulating barrier created by the subslot cover, more heat can be removed from the rotor winding near the ends of the rotor slot and exhausted near the axial center of the machine, thus contributing to a more uniform axial temperature profile for the rotor of FIG. 2, for example.

Additionally, my new concept for rotor slot insulation clearly occupies less space and thus allows more room for copper, rotor iron and subslot area. Furthermore, it provides the necessary creepage path between the conductors and the rotor iron by making use of both sides of the armor surface. The creepage is, therefore, almost entirely in the radial-axial plane. Such a characteristic is desirable from the standpoint of maintaining self-cleaning surfaces which do not collect carbon dust and other contaminants from the gas coolant that are often present in open ventilated machines. In the present design the radial surfaces will remain free of deposits by the combined effect of high velocity gas flow and centrifugal forces pulling the contaminants radially outward.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Slot armor for use in dynamoelectric machines including a metal rotor having axially extending slots with conductors disposed therein and subslots wherein the widths of the subslots are smaller than the widths of the slots, said slot armor comprising:

insulating layers of substantially uniform thickness each extending axially and radially along a side of each of said slots between said conductors and said rotor, and said layers also each extending in an offset manner radially inwardly from said slots into said subslots such that said layers are spaced from the sides of each of said subslots.

2. Slot armor as specified in claim 1 wherein each said insulating layer extends into said subslots a distance sufficient to prevent electrical creepage between said conductors and said rotor.

3. Slot armor as specified in claim 1 wherein each of said insulating layers extends into said subslots a distance sufficient to eliminate the need for an insulating subslot cover.

4. Slot armor as specified in claim 3 wherein said distance is at least half the distance to prevent electrical creepage between said conductors and said rotor.

5. In a dynamoelectric machine having a metal rotor with a plurality of axially extending slots, each slot including first and second substantially radial sides, a subslot and non-radial portions connecting said radial sides and subslot, a plurality of conductors disposed in said slots with electrical insulation disposed between the conductors and said radial sides and said non-radial portions of each said slots, an improved slot insulation system comprising:

integral insulating slot armors of substantially uniform thickness each having first portions extending in a first substantially radial direction along a side of each of said slots between said conductors and said metal rotor and further including a second radial portion extending into a corresponding subslot.

said first and second radially extending portions each being connected by a third non-radial armor portion at said non-radial armor portion connecting said radial sides and said subslot.

6. The improved slot insulation system of claim 5 wherein said first and second radially extending portions of each slot armor are offset from each other in a circumferential manner.

7. The improved slot insulation system of claim 5 wherein said second radial and third non-radial armor portions are sufficiently long collectively to prevent electrical creepage between said conductors and said rotor.

8. The improved slot insulation system of claim 5 wherein collective lengths of said second radial and said third armor non-radial portions are sufficient to prevent electrical creepage between said conductors and said rotor without using an insulating subslot cover.

9. The improved slot insulation system of claim 5 wherein said third non-radial armor portions are sufficiently long as to space said second radial armor portions from the sides of the subslots.

10. The improved slot insulation system of claim 9 wherein said second radial and third non-radial armor portions are sufficiently long collectively to prevent electrical creepage between said conductors and said rotor without using an insulating subslot cover.

11. The improved slot insulation system of claim 5 wherein the length of the second radial armor portion is about half the distance necessary to prevent electrical creepage between said conductors and the rotor.

12. The improved slot insulation system of claim 5 wherein said conductors include openings for receiving a coolant from said subslot.

13. The improved slot insulation system of claim 5 wherein said conductors include spaced openings for receiving a high velocity coolant gas flow from said subslot.

* * * * *